Nov. 5, 1957 — A. M. HARTMAN ET AL — 2,812,440
GAMMA RAY WALL THICKNESS MEASURING DEVICE
Filed March 29, 1956 — 3 Sheets-Sheet 1
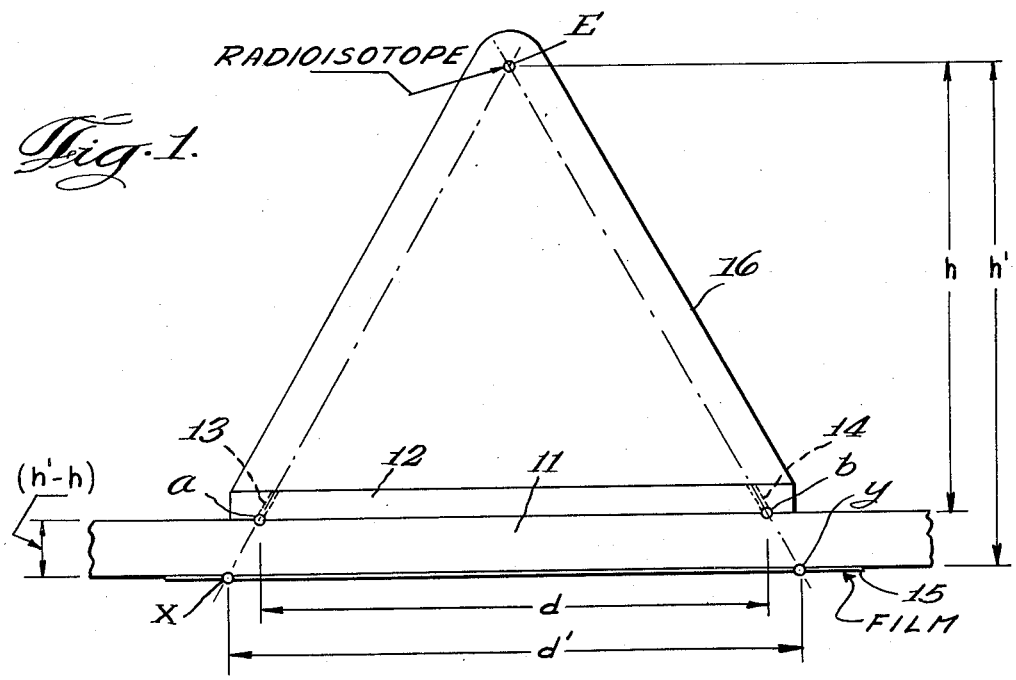
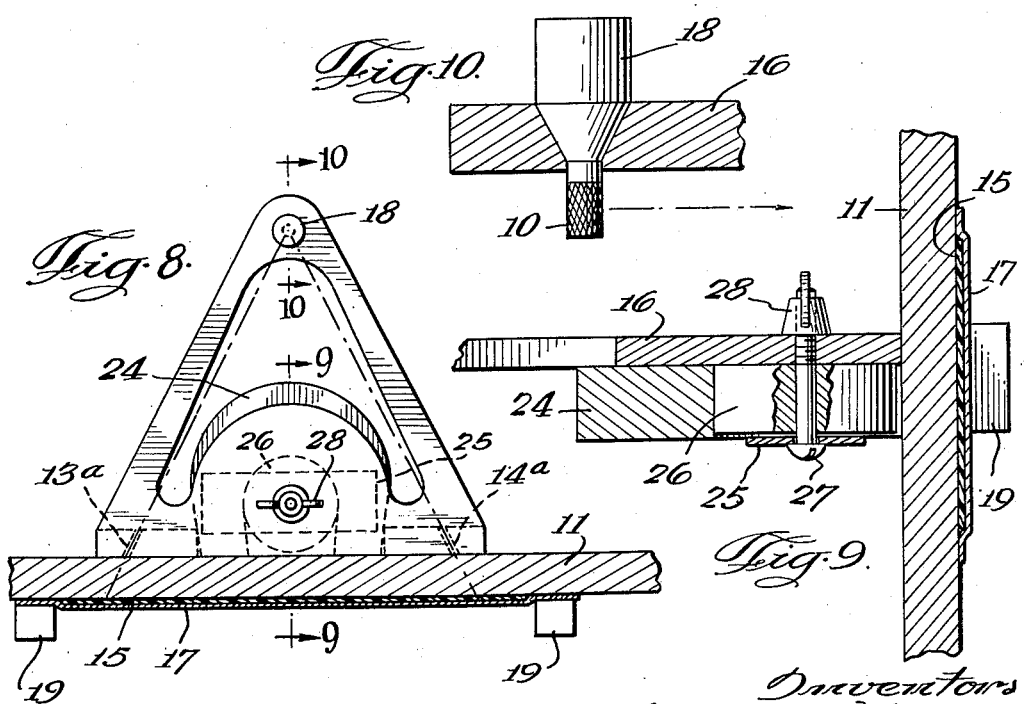
Inventors
Albert M. Hartman
LeRoy A. White
By Everett A. Johnson
Attorney

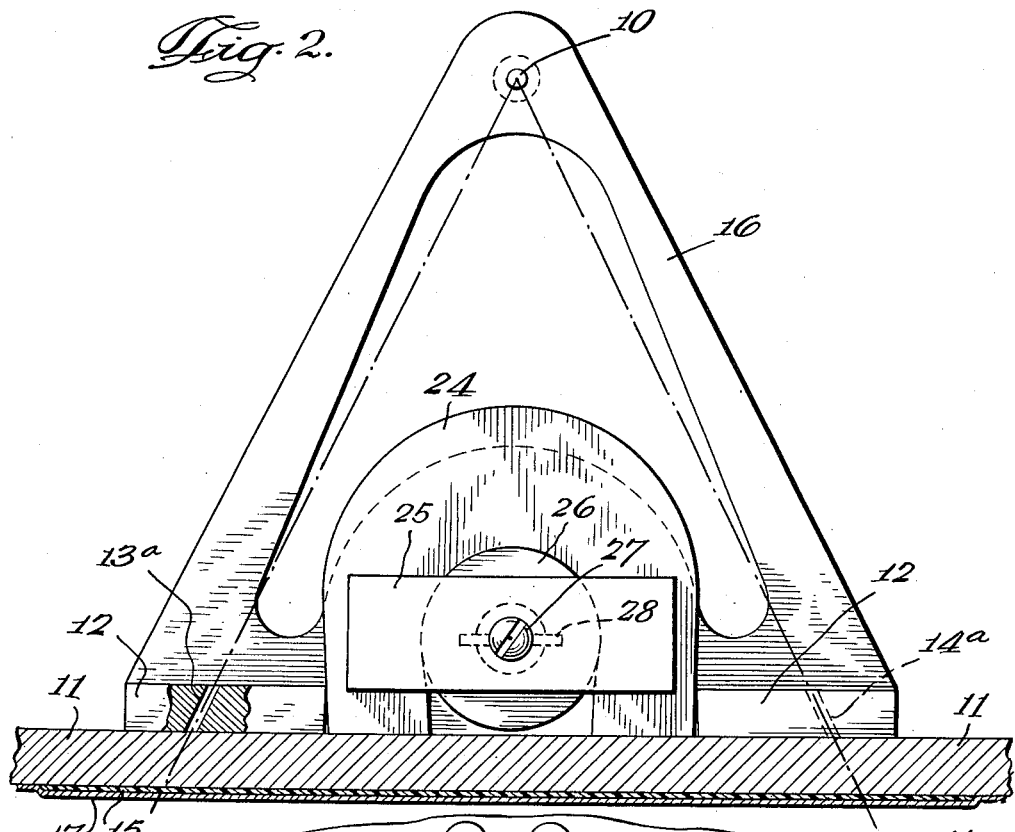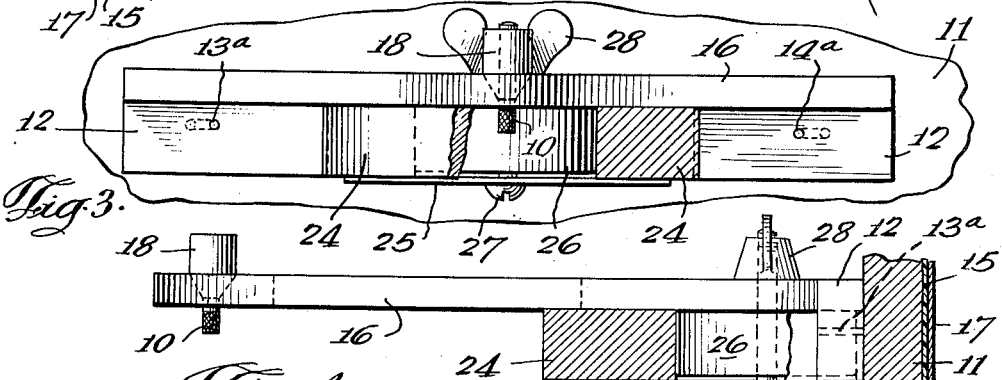

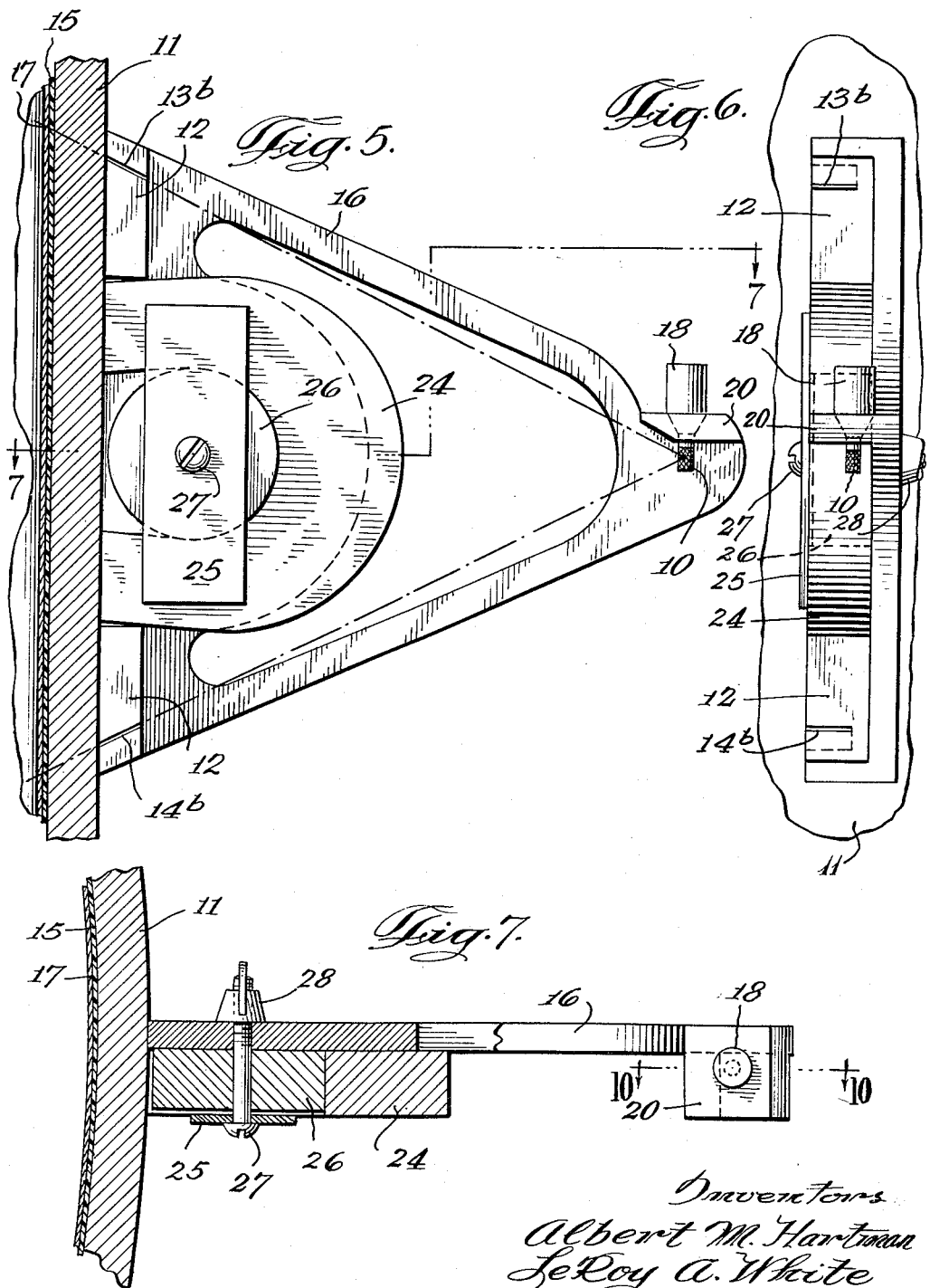

United States Patent Office 2,812,440
Patented Nov. 5, 1957

2,812,440

GAMMA RAY WALL THICKNESS MEASURING DEVICE

Albert M. Hartman, Hammond, and Le Roy A. White, Highland, Ind., assignors to Standard Oil Company, Chicago, Ill., a corporation of Indiana Application March 29, 1956, Serial No. 574,855

9 Claims. (Cl. 250—65)

This invention relates to a method and apparatus for measuring thickness with the aid of penetrating radiation. More particularly, the invention relates to a method and means for obtaining the wall thickness of a metal vessel or pipe line.

Heretofore, wall thicknesses have been obtained by perforating the vessel wall or partition, by ultrasonic measuring instruments, or by back-scattering radiation techniques. None of these is entirely satisfactory. The drilling of test holes is destructive and time consuming. The ultrasonic techniques are inaccurate on thin materials, must be used on smooth surfaces, and work poorly in cold weather. The back-scattering type instrument is expensive, heavy, bulky and unreliable on materials over 0.5 inch thick. Both of these latter systems require trained personnel and considerable time per thickness reading.

Primary objects of this invention are, therefore, to provide a method and means for determining thickness which is non-destructive, which will work in any kind of weather on any type surface, which is adaptable for use on very thin and on heavy walls, which is quick and positive in its operation, and which does not require highly trained technical personnel to operate.

Another object of this invention is to provide an apparatus which is rugged, foolproof, and inexpensive in construction. A further object is to provide an apparatus which does not require any electrical current to operate. An additional object is to provide an apparatus which is readily portable and can be used on remote and relatively inaccessible locations. Still another object is to provide an apparatus which is self-supporting on the structure to be measured. These and other objects of the invention will become apparent as the description of the invention proceeds.

Briefly, according to the invention, we provide an apparatus based upon the theory of similar triangles and the fact that when a gamma-ray emitting source is placed on one side of a material and film sensitive to gamma radiation is placed on the other side, any differences in radiation transmission will be recorded on the film. Thus, according to the invention, a radiation source is placed a definite distance from the wall to be measured; a shield is disposed over the surface between the source and the wall; a pair of spaced and angularly directed channels of lesser absorption coefficient than said shield are provided in the shield, these channels permitting more radiation to pass through to the backing film where two bench marks appear on the film. The distance between the marks is measured, and from this measurement the wall thickness can be calculated. Further details of the method and apparatus will be described by reference to the accompanying drawings wherein:

Figure 1 is a diagram illustrating the method;

Figures 2, 3 and 4 are bottom plan, end and side views respectively of a device for use on substantially vertical planar surfaces or horizontal vessels;

Figures 5, 6 and 7 are side, end and top views, respectively, on an embodiment of the device for use on curved surfaces of vertical vessels, Figure 7 being taken along the line 7—7 in Figure 5;

Figure 8 schematically illustrates a film holder;

Figure 9 is a section taken along the line 9—9 in Figure 8; and

Figure 10 is a section taken along the line 10—10 in Figures 7 and 8.

Referring to the diagram of Figure 1, the source 10 is placed in a frame 16 at point E spaced from the wall 11. A shield 12, having channels 13 and 14, is held onto the surface of the wall 11 and the film 15 is supported on the opposite side of the wall 11. Upon exposure of the film 15, the two channels 13 and 14 are recorded as black dots $x$ and $y$ on the film 15.

The triangles E$ab$ and E$xy$ are similar and triangle E$ab$ can be of any size. Since the triangles are similar, the altitude $h$ is to the base distance $d$ between $a$ and $b$ as the altitude $h'$ is to the base distance $d'$ between the dots or images $x$ and $y$ on film 15. Thus, $h/d = h'/d'$. When the altitude $h$ and the base $d$ are equal, then $h'$ and $d'$ are equal and the thickness of wall 11 is $d'$ minus $d$ or $h$.

In a preferred embodiment of the invention shown in Figures 2, 3, 4, 8, 9 and 10, the altitude $h$ of the frame 16 is five inches and the distance $ab$ across the base between the channels 13 and 14 is also five inches. If this apparatus were used and the film 15 were placed skin-tight against the opposite surface of the wall 11, the wall thickness could be obtained by substracting five inches from the measured distance between the images $x$ and $y$ on the film 15. However, in practice, the film 15 is handled in a film holder 17 and is not skin-tight against the wall 11. Therefore, it is necessary to determine by experiment the correction factor for the distance the film 15 is actually away from the wall 11. This correction factor will vary according to the type of film holder 17 used and how it is fastened to the opposite side of the vessel wall 11. This may be done by tape (not shown) or by magnets 19 as shown schematically in Figure 8.

Table I shows the correction factor obtained using G. E. Flexible X-Ray Exposure Holder No. E–0162E. From this Table I it can be seen that using the apparatus of Figures 2, 3 and 4, any unknown wall thickness can be obtained by substracting 5.08 inches from the measured distance between the black images $x$ and $y$ recorded on the film 15.

*Table I*

| Film No. | Exposure Time [1] | Distance ($d'$) Between Images | Actual Calipered Plate Thickness | Difference (5″+ Corr. Factor) | Correction Factor |
|---|---|---|---|---|---|
| | Minutes | Inches | Inches | Inches | Inches |
| 1 | 13 | 5.34 | 0.26 | 5.08 | .08 |
| 2 | 15 | 5.45 | 0.38 | 5.07 | .07 |
| 3 | 15 | 5.49 | 0.41 | 5.08 | .08 |
| 4 | [2] 12 | 5.59 | 0.52 | 5.07 | .07 |
| 5 | 19 | 5.70 | 0.62 | 5.08 | .08 |
| 6 | 21 | 5.85 | 0.76 | 5.09 | .09 |
| 7 | 30 | 6.10 | 1.03 | 5.07 | .07 |
| 8 | 60 | 6.84 | 1.76 | 5.08 | .08 |
| | | | | | Av.= .078 |

[1] Using 165 millicuries cobalt-60 source with Kodak "A" film. Developing period 8 minutes at 68° F. using Kodak Rapid X-Ray developer.
[2] Exposure time calculated with film density of 1.5. All other exposure times were calculated using a film density of approximately 2.0.

Referring in more detail to the drawings, the frame 16 may be made of aluminum or steel, the latter being preferred. Steel is preferred material for the device to give good control with shorter exposure times. However, the shield 12 may be made of lead in the region of the channels 13 and 14 but in any event constructions should be used to give sharp images in the form of black lines or dots (corresponding to the shape of channels 13 and 14) on the exposed film 15.

The source 10 is confined within removable holder 18 and held by gravity in seats 21 or 22 in the frame 16. In Figures 5, 6 and 7 the seat 22 is in off-set ledge 20 so that the source 10 is exposed to the slits 13b and 14b in shield 12.

The frame 16 is held against the wall 11 by a magnet assembly 23 shown in Figures 8 and 9. The assembly 23 includes the magnet 24, a transverse plate 25, boss 26, a tie bolt 27, and wing nut 28. The frame 16 includes a bore 29 which receives the bolt 27 which is in turn secured by the wing nut 28.

The poles of the magnet 24 are arranged within the frame 16 between the shields 12. In this manner, the frame 16 is magnetically held against the wall to be examined and source holder 18 is dropped into seat 20 or 21 depending upon whether the vessel to be examined is vertical or horizontal.

Although we have described the invention in terms of specific examples and operations which have been set forth in some detail, it is to be understood that these are by way of illustration only and that our invention is not limited thereto. Alternative embodiments of apparatus and variations in operating techniques will become apparent to those skilled in the art in view of our disclosure. Accordingly, modifications in the invention and the mode of using the apparatus are contemplated without departing from the spirit thereof.

What we claim is:

1. A device for measuring the thickness of vessel walls having parallel surfaces comprising a source of gamma rays, frame means supporting said source, shield means on said frame means disposed between the source and the wall, film means sensitive to gamma rays arranged on the other side of the wall to be measured, a pair of angularly disposed channels in said shield means adapted to pass gamma radiation from said source through said wall onto said film, said channels, said source, and said film being disposed in a fixed predetermined array, the distance between the images on said film giving a measure of the thickness of said wall.

2. A device for measuring the thickness of opaque bodies capable of passing gamma radiation comprising a source of gamma rays disposed on one side of the body, two marker channels relatively transparent to said rays disposed in the beam of said rays from said source, said channels being spaced from each other and terminating at the surface of said body, and gamma ray-sensitive film means arranged on the other surface of the body from the source and adapted to be exposed by rays passing through said channels.

3. An apparatus adapted for use in non-destructive measurement of the thickness of a wall comprising a source of gamma rays, a shield between said source and said wall, a pair of image-forming channels through said shield, said channels being relatively transparent to gamma rays, gamma ray-sensitive film means adapted to be exposed to gamma rays passing through said channels and the wall being measured, a frame means supporting said source and said shield on said wall, a magnetic holder for disposing said frame means, said magnetic holder including a magnet, a support plate for said magnet, a tie bolt passing through said support plate and said magnet, a bore in said frame means adapted to receive said tie bolt, and a wing-nut for securing said magnetic holder on said frame.

4. The apparatus of claim 2 wherein said channels comprise cylindrical bores having diverging axes in register with said source.

5. The apparatus of claim 2 wherein said channels comprise angularly disposed slits in an opaque shield.

6. The apparatus for measuring the thickness of a wall comprising means for subjecting one side of the wall to gamma rays, a shield means, means for placing said shield means on said wall and in the path of the rays striking the wall, said shield means including at least two ray-transparent bench marks, and means for determining the thickness of the wall from the distance between the images on a gamma ray-sensitive film disposed on the opposite surface of said wall.

7. The apparatus for measuring the thickness of a wall comprising the combination of means for subjecting the wall to a beam of penetrating rays from a source located a known distance from said surface, means for intercepting rays from said source by means of an opaque shield means having image-forming channels therein substantially transparent to such rays, and means for measuring the distance between the exposed images on a ray-sensitive member, whereby the thickness of the wall may be computed from the distance between the formed images and the distance between the source and the surface of the wall.

8. The apparatus for determining the thickness of a ferrous wall with the aid of gamma rays comprising means for directing a source of gamma rays toward one surface of the wall, the source being located a known distance therefrom, means for disposing a gamma ray-sensitive means on the opposite surface of the wall, a shield between the source and the wall adapted to throw a shadow on said film and having two image-forming channels spaced apart a known distance and terminating in contact with the exposed surface of the wall, and means for measuring the distance between two images produced on the film by radiation passing through the said channels.

9. The apparatus of claim 7 wherein said ray-sensitive member comprises a film, a film holder, and magnetic means for securing the film holder on the opposite side of the wall.

References Cited in the file of this patent

UNITED STATES PATENTS 2,675,482    Brunton _____ Apr. 13, 1954